United States Patent Office 3,029,255
Patented Apr. 10, 1962

3,029,255
COMPOUNDS HAVING AN AMBERGRIS SCENT
AND THEIR PREPARATION PROCESS
Max Stoll, Geneva, Switzerland, assignor to Firmenich
& Co., Successeurs de la Societe Anonyme M. Naef &
Cie., Geneva, Switzerland, a corporation of Switzerland
No Drawing. Original application Oct. 24, 1950, Ser.
No. 191,939. Divided and this application July 27,
1956, Ser. No. 601,336
Claims priority, application Switzerland Nov. 3, 1949
3 Claims. (Cl. 260—345.2)

It is still completely unknown what the fragrant components of ambergris are. Its principal constituent, the tri-terpenic alcohol ambrein, is scentless in the pure state and yields by degradation a single fragrant product, namely dihydro-γionone which does not truly smell like ambergris, and several other, scentless, products.

It is, on the other hand, known that sclareol, the di-terpenic diol, which is the principal constituent of the essential oil from clary sage, is always accompanied by a faint scent of ambergris although it is scentless in the pure state. The ozonolysis of one of its neutral degradation products, namely the anhydride of the 1-butylone-2-hydroxy-2,5,5,9-tetramethyl-decaline which is also called sclareol oxide (Formula I), followed by a hydrolysis or by a reduction of the ozonide formed, yields a mixture of at least four products, all of which are scentless in the pure state, viz.:

(1) 2 - acetoxy - 2,5,5,9 - tetramethyl - decalyl - acetic acid (Formula II);
(2) a mono-acetylated γ-diol, namely the 2-acetoxy-2,5,5,9-tetramethyl-decalyl-ethylol (Formula III);
(3) an acetylated hydroxy-aldehyde, namely the 2-acetoxy - 2,5,5,9 - tetramethyl - decalyl - ethanal (Formula IV);
(4) a neutral product of unknown constitution of the empirical formula $C_{18}H_{30}O_2$.

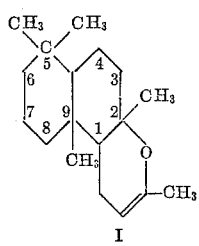

I

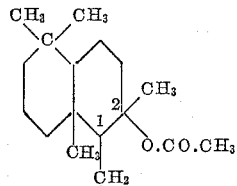

II

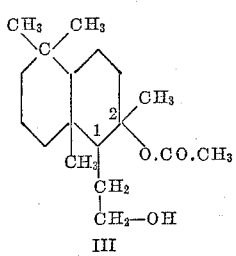

III

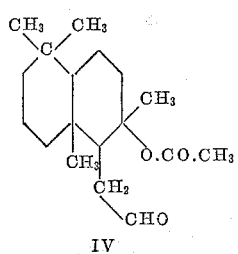

IV

The unexpected discovery has now been made that by transforming either the acid of the Formula II, or the diol of the Formula III, or the aldehyde of the Formula IV, by the loss of acetic acid, into an unsaturated aldehyde, a product is obtained, namely the $\Delta^{1,2}$-2,5,5,9-tetramethyl octalyl acetic aldehyde (Formula V), which has a powerful and clinging ambergris scent. It has also been ascertained that the corresponding alcohol, the $\Delta^{1,2}$-2,5,5,9-tetramethyl octalyl-ethanol (Formula VI) possesses likewise a strongly clinging scent of an ambergris character. These two unsaturated substances, which have never before been synthetically produced, may advantageously replace the unknown fragrant substances of the ambergris. They form therefore new and valuable compounds which can be used in the perfumery and cosmetics trade wherever a scent of an ambergris character is desired.

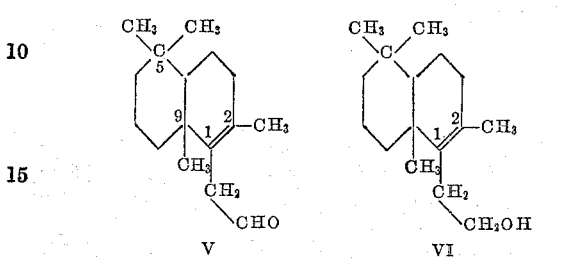

V                    VI

It has further been ascertained that, in addition to the compounds corresponding to the Formulae V and VI, those of their isomers, the double bond of which is placed between the carbon atom 2 and one of its adjacent carbon atoms (apart from carbon atom 1), present likewise a scent of an ambergris character. Thus, in a general manner, the unsaturated compounds presenting a 2,5,5,9-tetramethyl-octalyl group or a 5,5,9-trimethyl-2-methylene-decalyl group, all having a double bond at the carbon atom 2 and presenting an aldehydic- or alcoholic radical in the side chain attached to the carbon atom 1, have been found to be new scent products of interest for perfumery.

The present invention, based on the discoveries stated hereabove, relates to new chemical compounds having an ambergris scent and to the chemical process for the preparation of these new compounds of the general Formula VIII to be found below. More particularly, the invention relates to the $\Delta^{1,2}$-2,5,5,9-tetramethyl-octalyl acetic aldehyde, to the $\Delta^{1,2}$-2,5,5,9-tetramethyl-octalyl-ethanol, to their isomers and in general to the unsaturated compounds presenting either a 2,5,5,9-tetramethyl-octalyl group or a 5,5,9-trimethyl-2-methylene-decalyl group, all having a double bond at the carbon atom 2 and presenting an aldehydic- or alcoholic radical in the side chain attached to the carbon atom 1.

This application is a division of application Serial No. 191,939, filed October 24, 1950, now U. S. Patent 2,809,-996, for Improvement in New Compounds Having an Ambergris Scent and Their Preparation Process. The claims of the parent case being directed to the above mentioned acetic aldehyde and ethanol and to their isomers having the double bond between the carbon atoms in positions 2 and 3, while the claims of the present application are directed to similar compounds having a methylene group at carbon atom 2 or an epoxide chain between carbon atoms 1 and 2.

The chemical process for preparing such compounds is characterized in that a substance presenting the 2,5,5,9-tetramethyl-decalyl group, comprising in the position 2 an eliminable radical, and in the position 1 one of the following radicals:

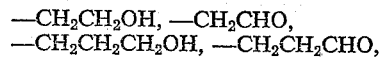

is transformed, by the elimination of the eliminable radical and by the formation of a double link at the carbon atom in the position 2, into a mixture of compounds having 16 to 17 carbon atoms and presenting the 2,5,5,9-tetramethyl-octalyl group or the 5,5,9-trimethyl-2-methylene-decalyl group.

The above transformation may be represented in its general form as follows:

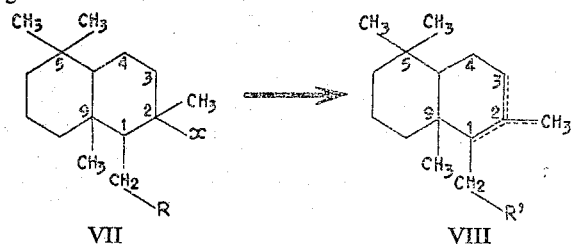

In the Formula VII, $x$ denotes an eliminable radical such as a hydroxy-acyl group (e.g. the group —O.CO.CH$_3$)

or the hydroxy radical or a halogen atom, and R indicates a functional radical such as alcohol, aldehyde, acid or ester. In the Formula VIII the unsaturatedness of the new compound results from the double bond between the carbon atom in the position 2 and one of its adjacent carbon atoms, and R' indicates an alcohol or aldehyde radical.

If R of the Formula VII is an alcohol- or aldehyde-radical, it is not necessary to transform it in order to obtain the new compound according to the Formula VIII. If on the contrary R is an acid- or ester-radical, it has to be transformed into an alcohol- or aldehyde-radical; this transformation may take place before or after the elimination of the radical $x$; if it takes place before, the case is reestablished where R of the Formula VII is an alcohol- or aldehyde-radical.

It has also been ascertained that when in the starting material the hydrocarbon radical in the position 1 presents a hydroxyl group, the elimination of the eliminable radical ($x$) does not only provoke the formation of an unsaturated product such as the one of the Formula VIII, but likewise the formation of a cyclic ether (Formula X) by the formation of a third ring. This latter transformation is represented as follows:

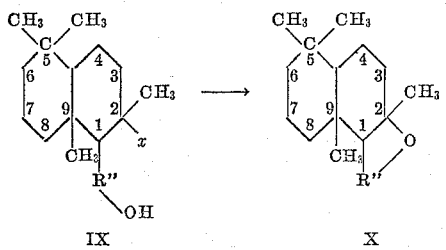

When the eliminable radical $x$ is a hydroxyl group, the above transformation is preponderant in respect of the one indicated by the Formulae VII and VIII, even in the case where R" is a chain of three carbon atoms. In fact, in the above formula IX, the hydrocarbon radical comprising the hydroxyl group, represented by

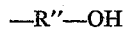

may for example be one of the following groups:

—CH$_2$—CH$_2$—OH, —CH$_2$—CH$_2$—CH$_2$—OH,

—CH$_2$—CH=CH—OH, (enolic forms of the corresponding aldehydes).

The same as the unsaturated alcohols or aldehydes indicated by the Formula VIII, the cyclic ethers according to the Formula X are characterized by a very fine and pronounced ambergris scent. These cyclic ethers are new substances and of evident interest for perfumery.

The present invention also relates to these new cyclic ethers.

As a starting material for the preparation of the compounds of Formula VIII, one may advantageously use the acetylated hydroxy-aldehyde (Formula IV) or the acetoxy-acid (Formula II) indicated above. These materials may preferably be obtained by the ozonolysis of the anhydride of 1-butylone-2-hydroxy-2,5,5,9-tetramethyl-decaline (Formula I) (Ruzicka, Seidel, Engel, Helvetica chimica acta 25, 621 (1942)), which yields conjointly the aldehyde of the Formula IV and the acid of the Formula II.

One may alternatively use as a starting material the alcohol of the Formula III or an ester of the Formula VII in which R is an ester-radical. Such an ester can for example be obtained by the saponification of the acid of the formula II alone or in admixture with the aldehyde of the Formula IV (in the latter case in the presence of air) which yields the lactone of the 2-hydroxy-2,5,5,9-tetramethyl-decalyl acetic acid. This lactone is subsequently transformed into an ester by transesterification. The ester may alternatively be obtained by the transesterification of the acid of the Formula II. One may still use as a starting material the γ-diol of the Formula VII in which $x$=—OH, and R=—CH$_2$OH.

As a starting material for the preparation of the cyclic ethers of Formula X, one may advantageously utilize the diol of the formula XII:

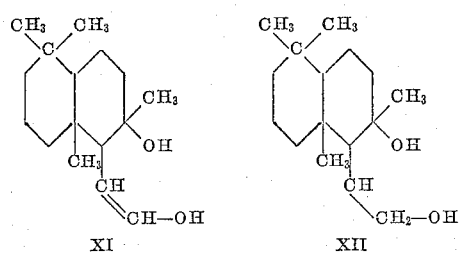

These substances may be prepared by the ozonolysis of the anhydride of the 1-butylone-2-hydroxy-2,5,5,9-tetramethyl-decaline (Formula I) followed by an appropriate treatment which yields inter alia a monoacetylated γ-diol, to wit the 2-acetoxy-2,5,5,9-tetramethyl-decalyl-ethanol (Formula III) and an acetylated hydroxy-aldehyde: the 2-acetoxy - 2,5,5,9 - tetramethyl-decalyl-ethanal (Formula IV).

The elimination of the radical $x$ (see Formulae VII and IX), whether the later is a hydroxy-acyl group, a hydroxy radical or a halogen may be effected by distillation of the substance in question under a reduced pressure, and according to the case in the presence of a catalyst, such as powdered copper bronze, aluminium oxide, sebacic acid, β-naphthalene-sulphonic acid, alcoholic sulphuric acid, etc. The said elimination may be effected at the same time and in the same reaction medium as the transesterification of the lactone or of the ester as mentioned hereabove since the same reagent is used for each of these operations.

Since all the products resulting from the elimination of the radical $x$ in the position 2 have an ambergris scent, whether they be unsaturated alcohols, unsaturated aldehydes, saturated or unsaturated cyclic ethers, one may utilize them raw and in admixture with one another. In this manner a costly purification is dispensed with.

Some examples of the process according to the invention will be given.

*Example 1*

The neutral fraction of the products resulting from the ozonolysis of the sclareol oxide (Formula I), which contains accordingly the aldehyde of the Formula IV, is distilled in the presence of a little copper bronze or sebacic acid under 15 mm. vacuum. The distillate is refractionated under 15 mm. vacuum and the fractions which distil off above 180° C. are submitted to a new treatment with copper until a practically complete elimination of the acetic acid is achieved. After separation of the acidic fraction, the new compound thus prepared, which is the aldehyde of Formula V, possesses an ambergris scent and has the following physical constants:

$Eb_{0.01mm}$. 100–105°, $d_4^{20}=0.993$–$0.995$, $n_D^{20}=1.512$–$1.514$

This compound yields a semicarbazone melting at 223–225° C.

Instead of carrying out the desacylation separately on the neutral fraction and on the acidic fraction resulting from the ozonolysis, the said desacylation can also be carried out on the mixture of both said fractions and the neutral and respectively acidic fractions may afterwards be separated.

Example 2

The acid fraction of the products resulting from the ozonolysis of the sclareol oxide (Formula I), or the product resulting from the oxidation by means of permanganate of the neutral fraction of the said ozonolysis (this fraction or this product containing the acid of the Formula II), is heated in a weak vacuum at 160–200° C. in the presence of copper bronze. After 40 minutes the elimination of the acetic acid is almost quantitative. The unsaturated acid thus obtained distils under 0.01 mm. at 135–145° C. This is reduced in ethereal solution by means of $LiAlH_4$, and the unsaturated alcohol of ambergris scent (Formula VI) having $Eb_{0.01\ mm}$. 116–117° C.

is directly obtained.

This alcohol yields a 3,5-dinitrobenzoate melting at 133–135° C.

Example 3

The same fraction or the same starting material as in Example 2 is heated during several days to boiling point with methanol to which 5% by weight of concentrated sulphuric acid has been added. By this treatment the acid of Formula II is transesterified. The ester obtained is of the Formula VII in which $x=$—OH and R= —CO.OCH$_3$, and is dehydrated by heating at 120–130° C. in the presence of a little iodine. The unsaturated ester resulting from this dehydration is reduced in ethereal solution by means of $LiAlH_4$ to the alcohol of the Formula VI.

If the methanol used hereabove contains more than 5% of sulphuric acid, a dehydration of the acid of the Formula II is effected which yields directly the unsaturated ester; the treatment with iodine is then unnecessary.

Example 4

The acid fraction of the products resulting from the ozonolysis of the sclareol oxide (Formula I) which accordingly contains the acid of the formula II, is saponified by means of alcoholic potash. The lactone which results from this saponification is then transesterified into a saturated ester of the Formula VII in which $x=$—OH, and R is an ester radical. This ester is dehydrated into an unsaturated ester which is then reduced, as in Example 3, to an alcohol of the Formula VI.

Example 5

The lactone obtained by the saponification of the acid fraction of the ozonolysis of the sclareol oxide or of the product of the oxidation by means of permanganate of the neutral fraction of the ozonolysis, is reduced, in ethereal solution, by means of $LiAlH_4$ or in alcoholic solution by means of sodium, to a saturated primary-tertiary glycol of the Formula VII in which $x=$—OH and R=—CH$_2$OH. By the distillation of this diol in a good vacuum over aluminium oxide at a temperature in the neighbourhood of 200° C., it is transformed into the unsaturated alcohol of the Formula VI.

Example 6

The lactone mentioned at the beginning of the Example 5 is treated at 20° C. with ethanol saturated with dry gaseous hydrochloric acid. After the reaction-mixture is filtered, the filtrate is poured into water; the rest of the chlorinated ester formed (Formula VI in which $x=$Cl and R is an ester radical) is extracted by means of a solvent which is immiscible with water. Once this ester is crystallized (melting point 78–79° C.), it is distilled in vacuo according to the process of the invention. A yield of 90% of unsaturated ester is obtained which is then reduced to the unsaturated alcohol (of Formula VI) by any known method, for example by means of $LiAlH_4$.

Example 7

11.2 g. of diol of the Formula XII are heated in the presence of 40 mg. of β-naphthalene sulphonic acid at 135° C. in vacuo; the reaction mixture is then distilled, and the fraction boiling under 10 mm. Hg between 168° and 173° C. is recovered. By the treatment of this fraction with petrol ether, 8 g. of epoxiode melting at 75–76° C. of the Formula X are recovered in which R″=—CH$_2$—CH$_2$—. This cyclic ether possesses a good ambergris scent, particularly in solution and after a certain time of exposure to the air.

Example 8

7 g. of the diol of the Formula XII are distilled under a vacuum of 0.1 mm. Hg over aluminium oxide which has been heated to 200–225° C. 5.5 g. of a distillate and 0.85 g. of water (retained in a tube cooled to —80° C.) are obtained.

By means of chromatography on aluminium oxide the distillate is separated into a saturated cyclic ether of the formula X(R″=—CH$_2$—CH$_2$—); melting point: 76° C., an unsaturated alcohol and an unsaturated hydrocarbon. The yield in cyclic ether is approximately 50%.

Example 9

12.7 g. of sclareol oxide $C_{18}H_{30}O$ (Helv. chim. acta 25, 625 (1942)) dissolved in 250 cc. of hexane (pure and dry) are subjected to ozonolysis at —30°. After saturation, the ozonide is reduced by adding to it in small batches 310 g. of a filtered ethereal solution titrating 2.5% of $LiAlH_4$. Finally one heats up to boil. After the usual treatment, one obtains 80% of a diol of the Formula XII and a small quantity of cyclic ether of the Formula X (R″=—CH$_2$—CH$_2$—) which are separated by treatment with petrol ether. In order to increase the yield in cyclic ether, the raw reduction product may be treated according to Example 7 or 8.

Example 10

The acetoxy-aldehyde of the Formula IX in which $x=$—OOCH$_3$ and R″=—CH=CH— originating from the ozonolysis of the sclareol oxide (see Example 9) is saponified in an absolutely oxygen-free medium. In order not to have to avoid the oxygen, one may transform the aldehyde into acetal or into Schiff's base by a known method, and saponify it subsequently. These two methods lead finally to the hydroxy-aldehyde of the Formula XI. By distillation or by simple heating in vacuo at 100 or 150° C., the hydroxy-aldehyde in its enol form is transformed by the elimination of water into unsaturated cyclic ether of the Formula X in which R″= —CH=CH—. At the same time the unsaturated aldehyde of Formula VIII (in which R′=—CHO) is formed, which is an isomer of the cyclic ether. The mixture obtained has the following characteristics: $Eb_{0.005\ mm}$. 100–110° C.; $C_{16}H_{26}O$; calculated C 82.1%, H 11.1%; found: C 82.3%, H 11.4%. By means of alkaline oximation 28% of unsaturated aldehyde is determined and by means of acid oximation 65% of cyclic ether. The oil possesses a very good ambergris scent.

Example 11

1.9 g. of diol prepared by reduction of the ambreinolid of the Formula IX, in which $x = -OH$ and $$R'' = -CH_2-CH_2-CH_2-$$

is dissolved in 80 cc. of methanol containing 7.2 cc. of concentrated sulphuric acid, and the whole is heated under reflux for 3 days. After the habitual treatment 1.75 g. of neutral parts are obtained. When recrystallized in alcohol or petrol ether, the cyclic ether thus obtained melts at 83° C., yield 70%.

Example 12

The diol of the Formula IX, in which $x = -OH$ and $R'' = -CH_2-CH_2-$ is treated in the cold by a cold-saturated solution of hydrochloric acid in absolute ether. After some days a mixture is formed of the cyclic ether of the Formula X, in which $R'' = -CH_2-CH_2-$, of the chlorinated alcohol of the Formula IX in which $x = -Cl$ and $R'' = -CH_2-CH_2-$, of the unsaturated alcohol of Formula VI and of its chloride. The proportions of these four products vary according to the reaction period, the temperature, the concentration and the excess of the hydrochloric acid. By simple heating to 100° in vacuo, the chlorinated alcohol of Formula IX is transformed into the unsaturated alcohol of Formula VI and into the cyclic ether of the Formula X. The latter is a stereoisomer of the one described in the Examples 1 and 2, and melts at 60–62° C. All these products have an ambergris scent and can be utilized pure or in admixture with one another. By distillation followed by saponification with caustic potash this mixture can be transformed into a strongly scented mixture of the cyclic ether and of the unsaturated alcohol. These two substances can be very easily separated by chromatography on aluminium oxide.

The invention comprises also the utilization of the new compound having an ambergris scent as a perfume or as a primary material in perfumery. When used in such a manner, this perfume or this material contains at least one compound presenting the 2,5,5,9-tetramethyl-octalyl group, the carbon atom in the position 2 of which participates either in a double bond or in a cyclic ether.

The perfume or the primary material comprising these two compounds can very easily be obtained by carrying out the process of the present invention during which both transformation indicated on the one hand by the Formulae VII and VIII, and on the other hand by the Formulae IX and X are jointly executed. The composition of a perfume containing inter alia these two compounds will now be given by way of example:

| | Parts by wt. |
|---|---|
| Unsaturated alcohols comprising 16 carbon atoms and presenting the 2,5,5,9-tetramethyl-octalyl group | 10 |
| Saturated cyclic ether comprising 16 carbon atoms and presenting the 2,5,5,9-tetramethyl-decalyl group | 5 |
| Amyrine, α and β | 80 |
| Dihydro ionone γ | 5 |

What I claim is:

1. The compound having an ambergris scent and represented by the formula

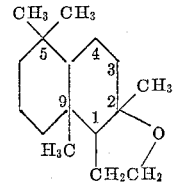

2. The compound having an ambergris scent and represented by the formula

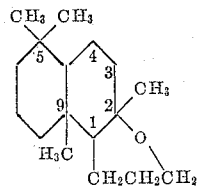

3. A method of preparing cyclic ethers of the formula

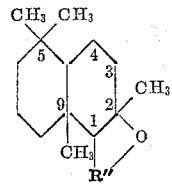

in which R″ is a member of the group consisting of $-CH_2-CH_2-$; $-CH_2-CH_2-CH_2-$ and $$-CH_2-CH=CH-$$

which consists in subjecting a diol of formula

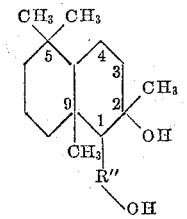

to heating under conditions selected from the group consisting of passage over $Al_2O_3$ heated between 200 and 225° C. to dehydrate the diol and heating in vacuo in the presence of β-naphthalene sulphonic acid beginning at 130° C. and then raising progressively the temperature up to 160° C.

References Cited in the file of this patent

UNITED STATES PATENTS 2,809,996     Stoll _____ Oct. 15, 1957

OTHER REFERENCES

C.A., Jan.-March, vol. 37, 1943, p. 877.
Ruzika et al.: Chem. Abst., 37, p. 877 (1943).
C.A., Apr.-June, vol. 42, 1948, p. 3374.
Lederer et al.: Chem. Abst., 42, p. 3374 (1948).

UNITED STATES PATENT OFFICE
CERTIFICATE OF CORRECTION

Patent No. 3,029,255            April 10, 1962

Max Stoll

It is hereby certified that error appears in the above numbered patent requiring correction and that the said Letters Patent should read as corrected below.

In the grant, lines 2 and 3, 12 and 13, and in the heading to the printed specification, lines 4 to 6, name of assignee, for "Firmenick & Co., Successeurs de la Societe Anonyme M. Naef & Cie.", each occurrence, read -- Firmenich & Co., Successeurs de la Societe Anonyme M. Naef & Cie. --; column 4, lines 25 to 34, formula XII should appear as shown below instead of as in the patent:

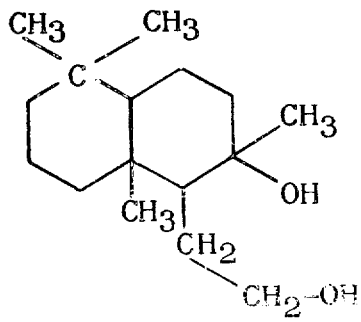

column 7, line 48, for "transformation" read -- transformations --.

Signed and sealed this 31st day of July 1962.

(SEAL)
Attest:
ERNEST W. SWIDER
Attesting Officer

DAVID L. LADD
Commissioner of Patents